United States Patent
Duskin et al.

(10) Patent No.: US 9,704,178 B2
(45) Date of Patent: Jul. 11, 2017

(54) CUSTOMIZABLE SEQUENCE OF CONTENT

(71) Applicant: Adobe Systems Incorporated, San Jose, CA (US)

(72) Inventors: Christopher J. Duskin, San Francisco, CA (US); Kimen C. Field, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 272 days.

(21) Appl. No.: 13/656,289

(22) Filed: Oct. 19, 2012

(65) Prior Publication Data

US 2014/0115111 A1    Apr. 24, 2014

(51) Int. Cl.
*G06F 15/16* (2006.01)
*G06Q 30/02* (2012.01)

(52) U.S. Cl.
CPC .............. *G06Q 30/0255* (2013.01)

(58) Field of Classification Search
USPC .............................. 709/219, 217
See application file for complete search history.

(56) References Cited

U.S. PATENT DOCUMENTS

| | | | |
|---|---|---|---|
| 6,161,127 A | 12/2000 | Cezar et al. | |
| 6,327,574 B1 * | 12/2001 | Kramer et al. | 705/14.66 |
| 6,763,379 B1 | 7/2004 | Shuster | |
| 7,464,344 B1 | 12/2008 | Carmichael et al. | |
| 8,234,166 B2 | 7/2012 | Filice et al. | |
| 2005/0091111 A1 | 4/2005 | Green et al. | |
| 2005/0138571 A1 * | 6/2005 | Keskar | G06F 17/30899 715/789 |
| 2008/0015878 A1 | 1/2008 | Feng et al. | |
| 2008/0155590 A1 | 6/2008 | Soukup et al. | |
| 2008/0201643 A1 * | 8/2008 | Nagaitis | G06F 17/30867 715/738 |
| 2008/0275755 A1 | 11/2008 | Brustein et al. | |
| 2009/0299835 A1 | 12/2009 | Greenbaum et al. | |

(Continued)

FOREIGN PATENT DOCUMENTS

WO    WO 0193161 A1 *    12/2001

OTHER PUBLICATIONS

"How Omniture Test & Target Works—A High-Level Overview of Implementation, Administration & Use and Review," Jul. 5, 2010, downloaded Oct. 19, 2012 from http://www.managingecommerce.com/technology/marketing/testing-targeting/how-omniture-test-target-works-implementation-administration-review-459, pp. 1-3.

(Continued)

*Primary Examiner* — Joseph E Avellino
*Assistant Examiner* — Marshall McLeod
(74) *Attorney, Agent, or Firm* — Kilpatrick Townsend & Stockton LLP

(57) ABSTRACT

A request for customized content may be received. Which content portion in a sequence of the customized content to provide may be determined based on state information regarding previous content interactions by a user of the client device. A next content portion in the sequence may then be provided based on that determination. Multiple different sequences may exist such that one of the sequences may be selected to be provided for a given user and/or client device. An effectiveness of the different sequences may be evaluated.

18 Claims, 6 Drawing Sheets

(56) References Cited

U.S. PATENT DOCUMENTS

2011/0066480 A1 3/2011 Herlein et al.
2012/0054627 A1* 3/2012 Priyadarshan ......... G06Q 30/02
　　　　　　　　　　　　　　　　　　　　715/738

OTHER PUBLICATIONS

"What is an Mbox and How does it relate to Omniture Test & Target?," Copyright © 2012 Managing E-commerce—Powered by Wordpress Lightword Theme by Andrei Luca, downloaded on Oct. 19, 2012 from http://www.managingecommerce.com/glossary/i-n/mbox, p. 1.
Adobe Systems, Inc., Adobe Development Connection / Dreamweaver Developer Center, "Getting started with the Adobe Test&Target Extension for Dreamweaver CS5," by Remus Stratulat, Sep. 12, 2010, downloaded on Oct. 19, 2012 from http://www.adobe.com/devnet/dreamweaver/articles/dw_tnt_overview.html, pp. 1-8.

* cited by examiner

CUSTOMIZABLE SEQUENCE OF CONTENT

BACKGROUND

Typical online marketing scenarios include repeatedly exposing a user to content (e.g., a banner advertisement or some other advertisement) in hopes that the user will act on the advertisement. In reality, the effectiveness of such a brute force marketing system may be diminished because the user has become desensitized to the presentation or message contained in the content. Because of the desensitization, the user may not actually even read the advertisement, much less act on it.

SUMMARY

This disclosure describes techniques and structures for creating and delivering a customizable sequence of content. One embodiment may include receiving a request for customized content. It may also include determining which content portion in a sequence of the customized content to provide (e.g., to a client device that requested the content). Determining which content portion may be based on state information regarding previous content interactions by a user of the client device. It may also include providing the next content portion in the sequence of content based on that determination.

DETAILED DESCRIPTION OF EMBODIMENTS

Figure 1:
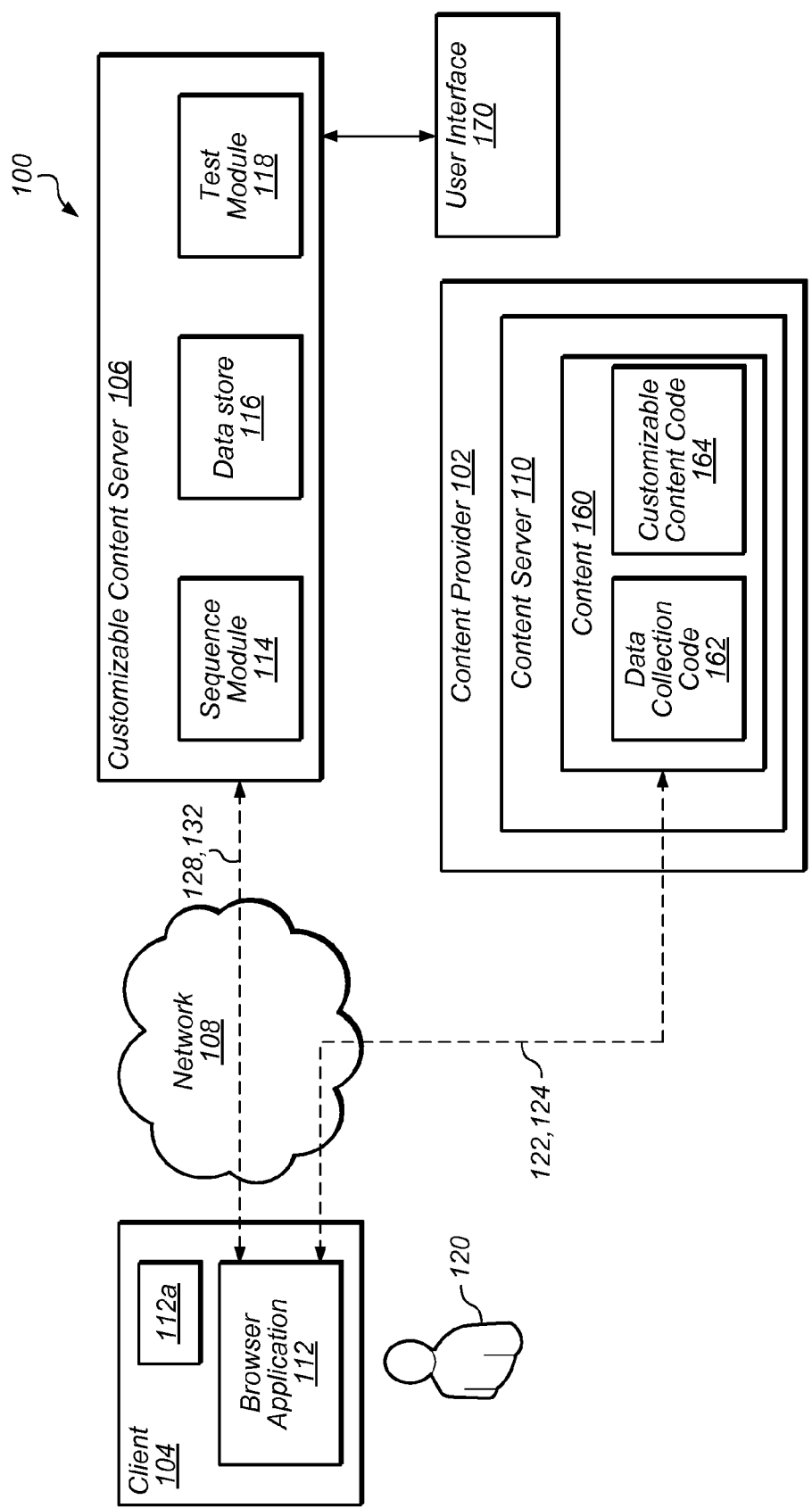
FIG. 1 is a block diagram that illustrates an example customizable sequence of content creation and delivery, according to some embodiments.

The following specification describes creating and delivery a customizable sequence of content. The customizable sequence of content may be used in online advertisement or for other online customizable content placement applications. The system may receive data indicative of content interactions by a user (e.g., a user's browsing activity), and, in response to occurrence of a customizable trigger as indicated in the data indicative of content interactions, display a corresponding content portion of the customizable sequence of content. Multiple sequences (with various triggers and/or content portions) may be created and simultaneously deployed such that the effectiveness of a sequence (and the constituent triggers and/or content portions) may be evaluated.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a sequence of configurable content, the terms "first" and "second" portions of content can be used to refer to any two portions of content of the sequence of configurable content. In other words, the "first" and "second" portions of content are not limited to logical portions of content 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for customizable sequence of content creation and delivery are described. Some embodiments may include a means for providing a customizable sequence of content. For example, a sequence module may receive a request for customized content, determine which content portion to provide, and provide the next content portion based on that determination. The sequence may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform receiving a request for customized content, determining which content portion to provide, and provide the next content portion based on the determination, as described herein. Other embodiments may be at least partially implemented by hardware circuitry and/or firmware stored, for example, in a non-volatile memory.

Although certain embodiments are described with respect to a webpage and/or website, it will be appreciated that the techniques disclosed herein may be employed with other forms of network content sites, such as documents with a traversable tree-like hierarchy (e.g., XML, HTML, etc.).

Turning now to the figures, FIG. 1 is a block diagram that illustrates a customized sequence of content creation and delivery system 100, according to some embodiments of the present disclosure. In the illustrated embodiment, system 100 includes content provider 102, client 104 and customizable content server 106. Each of content provider 102, client 104 and customizable content server 106 may be communicatively coupled to one another via a network 108. Network 108 may include any channel for providing effective communication between each of the entities of system 100. In some embodiments, network 108 includes an electronic communication network, such as the internet, a local area network (LAN), wireless LAN (WLAN), WiMAX network, cellular communications network, or the like. For example, network 108 may include an internet network used to facilitate communication between each of the entities (e.g., content provider 102, client 104 and customizable content server 106) of system 100.

Content provider 102 may include source of information/content (e.g., a file defining display information for one or more content items, such as a website) that is provided to client 104. For example, content provider 102 may include media portals or dynamic websites used to present media and/or customizable sequences of content. In some embodiments, content provider 102 may include content server (e.g., network content server, web content server) 110. Content server 110 may include content 160, such as network and/or website content (e.g., web pages), stored thereon that are accessed and loaded by client 104 when viewing respective webpages of content provider 102. Content 160 may include data collection code 162 and/or customizable content code 164, as described in detail below, among other components.

Client 104 may include a computer, mobile device (e.g., cellular phone, tablet device, etc.), or similar device used to access content provided by content provider 102. In some embodiments, client 104 may include a computer employing a browser application 112 that is used to interact with webpages and websites provided by content provider 102. For example, browser application 112 may render a webpage of content provider 102. Rendering may include executing HTML code for the webpage provided by content provider 102. As a result, browser may also generate appropriate request for data from various servers of system 100 to assemble the webpage for display on client 104. Webpage 104 may be viewed by a user via a monitor or similar presentation device at client 104.

Customizable content server 106 may include a system for the collection and processing of data indicative of content interactions by a user (e.g., browsing activity, cookies, network analytics, web analytics, etc.) to determine which customizable content in a sequence of customizable content to provide to browser application 112. Customizable content server 106 may include a third-party website traffic statistic service that is a physically separate entity from content provider 102. Customizable content server 106 may reside on a different network location from content providers 102 and client 104. Data indicative of content interactions may include data that describes usage and visitation patterns for websites and for individual webpages within the website. The data may include a user identifier, for example, as well information describing the webpages visited, which selectable elements (e.g., links) have been selected, which browser was used, location of the client device, IP address, MAC address, and the dates and times of the visits.

In the illustrated embodiment, customizable content server 106 includes sequence module 114, data store 116, and test module 118. Customizable content server 106 may service requests for customized content from one or more clients. For example, upon loading/rendering of a webpage 112a by browser 112 of client 104, browser 112 may generate a request to customizable content server 106 via network 108. Sequence module 114 of customizable content server 106 may process the request by returning appropriate content (e.g., customized content from a sequence of content) to browser 112 of client 104. Customizable content server 106 may record the request, for example in data store 116, and record additional information associated with the request, such as the date and time, data indicative of content interactions, and/or identifying information that may be encoded in the resource request. Sequence module 114 may parse the received request and received data and determine which content portion in a sequence of content to return to browser application 112. For instance, sequence module 114 may determine if a trigger corresponding to a particular content portion has occurred (e.g., by comparing the data indicative of any previous content interactions with sequence configuration information), and if so, return the associated portion of content in response to the request. In some embodiments, data store 116 may reside in a remote location from customizable content server 106. In some embodiments, test module 118 may compare results of the effectiveness of multiple different sequences of content and generate a report on the comparison, as described herein. Report generation may occur in a stand-alone application or may occur as part of a browser plug-in. The metrics of the comparison may be defined by a website administrator of content provider 102 or other party through user interface 170. User interface 170 may also be used to create the sequence of content including selecting various content portions and respective trigger events for those content portions, as described herein.

In some embodiments, a user 120 interacts with a device at client 104, to execute a software application, such as browser application 112 of client 104, for accessing and displaying one or more webpages 112a. In response to a user command, such as clicking on a link or typing in a uniform resource locator (URL), browser application 112 may issue a webpage request 122 to web content server 110 of content provider 102 via network 108 (e.g., via the Internet). In response to request 122, content server 110 may transmit the corresponding webpage code 124 (e.g., HTML code corresponding to webpage 112a) to browser application 112. Browser application 112 may interpret the received webpage code to display the requested webpage to user 120 at client 106. Browser application 112 may generate additional requests for content (not shown in FIG. 1) from the server, as needed. In one embodiment, content 160 may include customizable content code 164, which may be code that represents a dynamic region of the webpage. Upon execution of the customizable content code 164, the request for the customized content may be generated and sent from browser application 112 to customizable content server 106.

In some embodiments, client 104 also transmits webpage visitation tracking information to customizable content server 106. For example, webpage code 124 may include executable code to initiate a request for data from customizable content server 106 such that execution of webpage code 124 and/or selection of selectable elements of browser 112 causes browser 112 to generate a corresponding request 128 for the data to customizable content server 106. In some embodiments, request 128 may itself have analytics data contained therein or associated therewith, such that transmitting request 128 causes transmission of analytics data from client 104 to customizable content server 106. Customizable content server 106 may process (e.g., parse) request 128 to extract data indicative of content interactions (e.g., analytics data) contained in or associated with request 128. In some embodiments, customizable content server 106 may transmit data indicative of content interactions and/or a corresponding report to content provider 102, or other interested parties.

Figure 2:
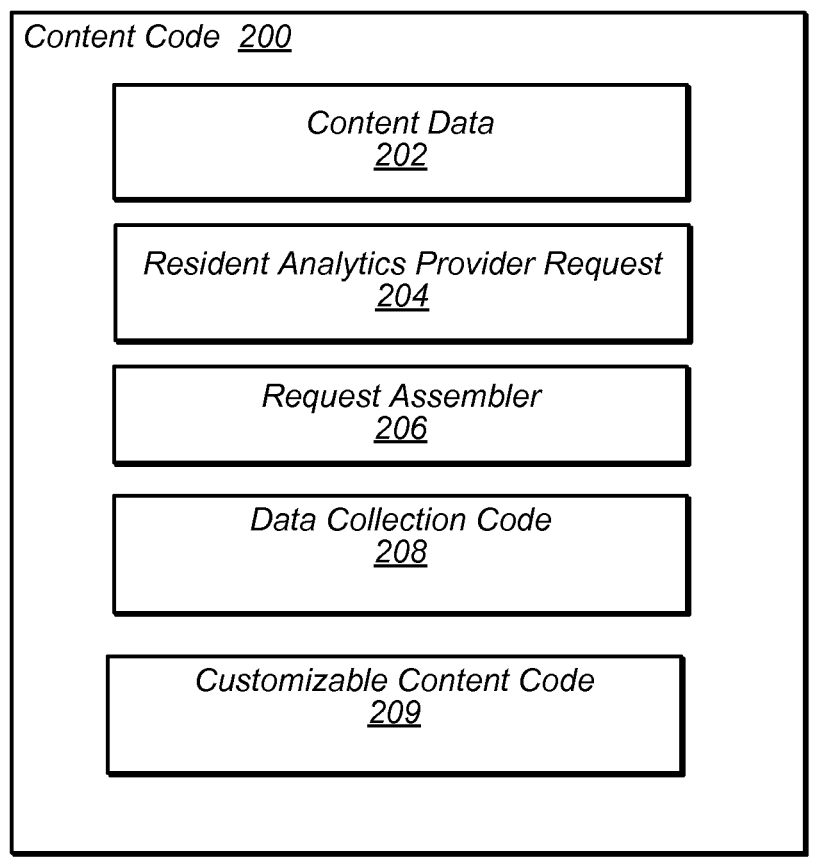
FIG. 2 is a diagram that illustrates an example of content code, according to some embodiments.

FIG. 2 is a diagram that illustrates content code 200, according to some embodiments. Content code 200 may include executable code that is provided in response to a request for a webpage or similar network site content. For example, content code 200 may be provided to browser application 112 of client 104 from content server 110 of content provider 102 in response to a request from browser application 112 for the corresponding webpage. In some embodiments, content code may include HTML code that is executed to render webpage 112a at a presentation device of client 104 for viewing by a user.

In the illustrated embodiment, webpage code 200 includes webpage data 202, a resident web analytics provider request ("resident request") 204, request assembler 206, and data collection code 208. In some embodiments, webpage data 202 may include traditional code for providing content of a webpage for viewing by a user. For example, webpage data 202 may include a definition of text to be displayed and/or images to be retrieved for display on the webpage. Further, webpage data 202 may include selectable elements (e.g., links, buttons, clickable elements (having an on click attribute), elements with anchor tags, etc.).

Resident request 204 may include a portion of webpage code 200 that, upon execution, initiates sending a request to a web analytics provider that includes web analytics data (e.g., data indicative of content interactions). In some embodiments, resident web analytics provider request 204 may generate a request similar that of request 128 described above with respect to FIG. 1. In some embodiments, additional requests to the analytics provider may be generated and sent in response to selection of a selectable element of content 160. For example, a user clicking on a link of a webpage may cause a request to be generated and sent to customizable content server 106.

Request assembler 206 may include a portion of webpage code 200 that, upon execution, assembles web analytics data in accordance with one or more requests to the web analytics provider. In some embodiments, request assembler 206 includes logic that compiles the web analytics data into a string that is embedded within a request similar to that of request 128 described above with respect to FIG. 1. For example, request assembler 206 may generate an image request to be provided to a web analytics server, the image request including, for example, "image.gif/XXX . . . " wherein "image.gif" is indicative of an image and the string "XXX . . . " is indicative of the web analytics data. In some embodiments, request assembler may also include logic capable of assembling multiple requests into a single request that is to be transmitted to the web analytics provider.

Data collection code 208 may, upon execution, allow for the generation of the data indicative of content interactions. In some embodiments, analytics data may be generated in response to selection of a selectable element of content 160. The analytics data may include multiple identifiers that identify the selectable element. In some embodiments, one of the identifiers may be a primary-tag type (e.g., link anchor tag, image, button, action, etc.). Other identifiers may be a hierarchical position identifier and, in some cases, a native browser identifier (e.g., sourceindex property). In some embodiments, identifiers such as the primary-tag type or an ID attribute (e.g., element ID attribute, region ID attribute, etc.) may be predefined.

Data collection code 208 may be cross-browser compatible (e.g., Firefox, Internet Explorer, Chrome, Safari, etc.) and standards compliant in that data collection code 208 may produce the same or similar data indicative of content interactions.

Customizable content code 209 may be executable by a browser to send a request for customized content to the customizable content server. In one embodiment, customizable content code 209 may be implemented in JavaScript. The code may be referred to as an mbox. Customizable content code 209 may include a number of mboxes. Each unique mbox may have a different name (e.g., mbox1.js, mbox2.js) that is usable by the customizable content server to determine which content portion and which trigger event correspond to that particular mbox.

It will be appreciated that each of these elements of content code 200 may be implemented within a single document/file/module, or may be provided in separate documents/files/modules.

Program instructions and/or data for implementing embodiments of data collection code and/or customizable content code as described herein may, for example, be stored on a computer-readable storage medium. A computer-readable storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Figure 3:
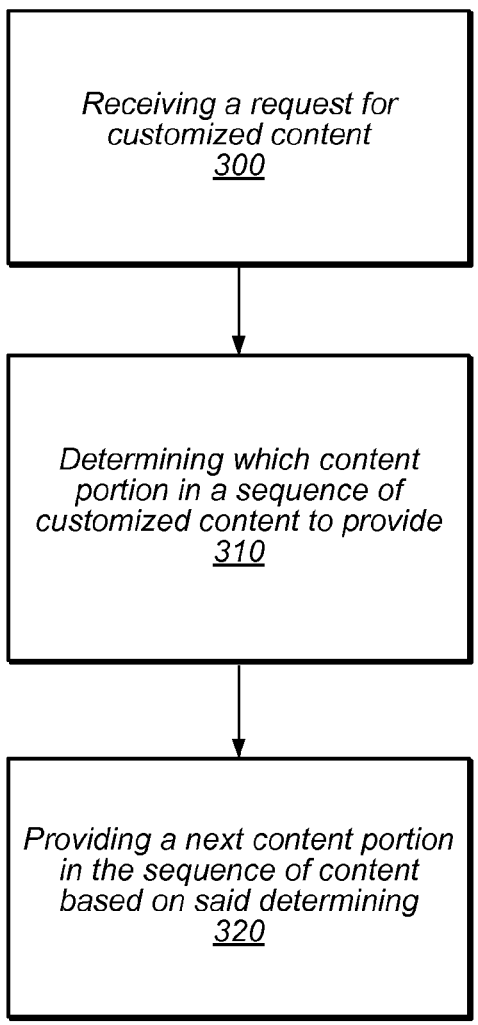
FIG. 3 is a flowchart that illustrates a method for providing a sequence of content, according to some embodiments.

Turning now to FIG. 3, one embodiment of providing a sequence of content is illustrated. While the blocks are shown in a particular order for ease of understanding, other orders may be used. In some embodiments, the method of FIG. 3 may include additional (or fewer) blocks than shown. Blocks 300-320 may be performed automatically or may receive user input. In one embodiment, the method of FIG. 3 may be performed by customizable content server 106.

As illustrated at 300, a request for customized content may be received. The request for the customized content may be received from a client device. In one embodiment, the request for customized content may be generated upon execution of code (e.g., customized content code) within network content (e.g., a website). For example, code within a website may indicate an area on the website into which the customized content may be displayed. Such code may, in one embodiment, be implemented in JavaScript. Upon execution of the JavaScript code, for instance by a browser application of the client device, a request for the customized content may be generated and sent from a browser of the client device to the customizable content server.

In one embodiment, other information may be received by the customizable content server in addition to the request for customized content. For example, data indicative of content interactions on the website having the area of customizable content and/or on other websites may be received. Such data may be first party tracking data (e.g., cookies). Data indicative of content interactions may include the time, data, browser used, demographic information of a user (if available), among other information. Other data indicative of content interactions may include data from a third party data aggregator. For instance, the third party data aggregator may store data (e.g., cookies) regarding a plurality of client devices and/or a plurality of users. Like the first party data, the third party data may also be received by the customizable content server.

The received data indicative of the content interactions (including the request for the customizable content) may be stored in a data store accessible by the customizable content server. Accordingly, state information may be maintained that is indicative of any previous content interactions by a user of the client device. As such, the state information may be the actual raw data including the previous content interactions or it may be a processed version of the previous content interactions to simply maintain a state of which trigger events have occurred and/or which customizable content portions have been provided. The customizable content server may maintain a profile for each client device, user, and/or both. For example, a profile may be specific to both a user and a client device or just one of a user or a client device. The profile may include the state information indicative of any previous content interactions as well as profile parameters, such as a segment identified as applying to the user and/or client device. Example profile parameters include: interested in mortgages, interested in laptops, etc.

In various embodiments, the stored data indicative of content interactions may persist over multiple discrete browsing events. For example, a profile for user A/device A may include data indicative of user A's content interactions on client device A over different browsing sessions over a several week period. An entire profile or a portion of the data stored in the profile may be archived or purged after a certain amount of time, or upon receiving a request to purge the profile or data from the profile.

Note that, in some embodiments, profiles may exist for a number of users, client devices, and/or user/client device combinations such that data indicative of content interactions may be maintained for a number of different users and/or client devices.

Data indicative of content interactions, which may also be referred to as analytics data, may be generated in a variety of ways. For example, such data may be generated in response to selection of a selectable element (e.g., a link, button, anything with an onclick attribute, bookmark, etc.) from the content (e.g., network content, website, FTP site, etc.) or in response to a user entering a URL in the address field of a browser.

Figure 4:
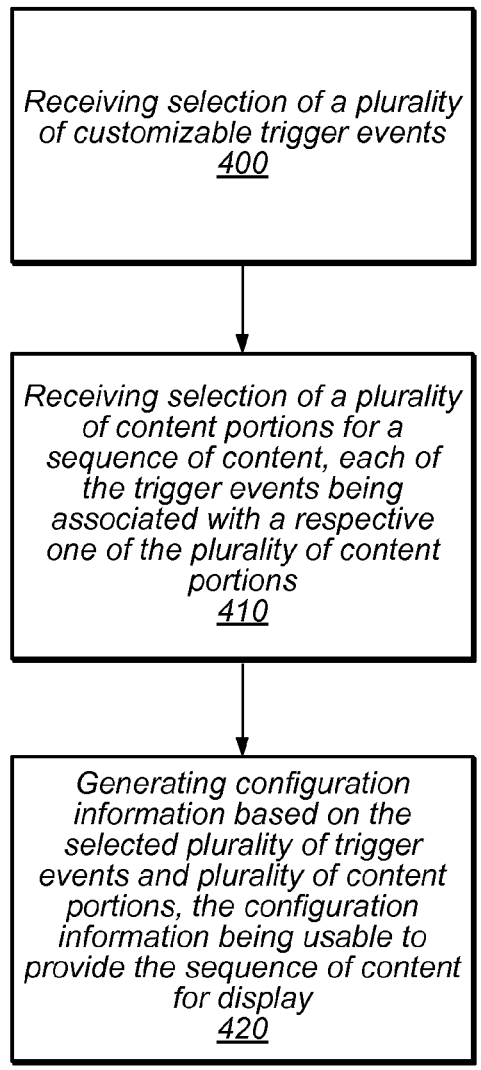
FIG. 4 is a flowchart that illustrates a method for creating a sequence of content and associated triggers, according to some embodiments.

At 310, which content portion in a first sequence of the customized content to provide to the client device may be determined. The determination may be based on the state information that is indicative of any previous content interactions by the user. Content portions of the sequence of customized content may include graphics, text, audio, video, etc. Each content portion may be associated with a respective customizable trigger event (e.g., visiting the website a certain number of times, selecting a particular link, etc.). The content portions of the sequence and information regarding the trigger events may be stored as part of sequence configuration information, as described herein. FIG. 4 illustrates one example technique for creating the sequence configuration information, and is described below. The sequence configuration information may be stored in a data store that is accessible by the customizable content server.

In various embodiments, the determining at block 310 may include determining, from the state information, that a first customizable trigger event associated with the next content portion has occurred. For example, consider a simple example with a sequence of customizable content that includes three content portions, in order, content 1, content 2, and content 3. Continuing the example, the customizable trigger events corresponding to content 1, content 2, and content 3 may be trigger 1, trigger 2, and trigger 3, respectively. If it is determined that trigger 1 has occurred, then content 1 may be provided to the client device at 320.

In some embodiments, determining that a customizable trigger event has occurred may include searching a data store (e.g., the data store storing the state information and data indicative of previous content interactions) for data indicative of which customizable trigger events have occurred. For example, the data indicative of content interactions may include data indicative of which customizable trigger events have occurred. Thus, it may then be determined, by searching the data store that stores the data indicative of content interactions (e.g., the profiles), that the customizable trigger event has occurred. As a result, it may be determined at block 310 that the content portion corresponding to the trigger event that occurred is to be provided to the client device.

In one embodiment, in addition to or instead of determining whether a trigger event has occurred, the data store may also be searched for which content portions in the first sequence have already been provided to the client device. For example, multiple trigger events may be based on the same trigger, such as the actual request for customized content received at block 300. As a specific example, each of triggers 1, 2, and 3 may be the request for the customized content. Content 1 may be a brown image, content 2 may be a blue image, and content 3 may be a video. Thus, upon the first request for content, content 1 may be provided to the client device. Upon the second request for content, content 2 may be provided to the client device and upon the third request, content 3 may be provided. Because the triggers are the same (request for customized content), keeping track of which content has been provided to the client device may help enable the system to provide the proper content portion in the sequence. Such information regarding which content has been provided to the client device may also be stored as part of the state information.

In one embodiment, in scenarios in which a trigger corresponds to repeated browser activity (e.g., third page load of a webpage, or different content portions having the same trigger as in the example above, etc.), a counter of occurrences of the trigger may also be maintained. Thus, instead of, or in addition to keeping track of which content has been provided to the client device, occurrences of trigger may also be maintained. The occurrences of the trigger and/or which content portions have been provided to a client device (and/or user) may be stored in the profile for the client device (and/or user).

As described herein, the data store may include data indicative of which customizable trigger events have occurred for each respective client. For example, each profile may include the data indicative of which customizable trigger events have occurred for the profile corresponding to that client device. In one embodiment, determining that a customizable trigger has occurred may include comparing the data from the data store (e.g., profile that includes the state information including data indicative of content interactions) with the sequence configuration information. If there is a match (e.g., trigger event 1 is present in the data in the data store and matches the trigger event 1 in the sequence configuration information), then the content corresponding to that match may be provided to the client device at block 320.

As illustrated at 320, a next content portion in the first sequence of the customized content may be provided to the client device based on the determination at block 310. In one embodiment, the next content portion in the first sequence that is provided to the client device at block 320 may be the initial content portion of the first sequence. For example, for a sequence of customizable content that includes, in order, content 1, content 2, and content 3, the next content portion provided to the client device at block 320 may be content 1 and may be provided after occurrence of the trigger event corresponding to content 1.

In various embodiments, multiple different sequences may be used. For example, client devices located in region A of a country may be provided a first sequence of content (after occurrence of respective triggers of a first plurality of trigger events) whereas client devices located in region B may be provided a second sequence of content (after occurrence of respective triggers of a first plurality of trigger events). Note that the distinction of which sequence to provide to a given client device (and/or user) may not be geographic but instead may be based on gender, age, browser, time of day, etc. In any event, the method of FIG. 3 may further include providing, to a different client device, a next content portion in a second sequence of content after determining that a customizable trigger event associated with the next content portion of the second sequence has occurred. In some embodiments, the second sequence and/or associated trigger events of the second sequence differ in at least one respect from the first sequence and/or associated trigger events of the first sequence. For example, the first sequence may include content A1, A2, and A3, in that order, with those content portions corresponding to triggers 1, 2, and 3. The second sequence may include content B1, B2, B3, in that order, with those content portions also corresponding to the same triggers 1, 2, and 3. In other examples, content may be the same but the triggers may be different. In yet other examples, both content and triggers may be different between the two.

In one embodiment, a report may be generated that compares the multiple different sequences. The report may indicate an effectiveness of the first sequence of content and the first plurality of customizable trigger events relative to the second sequence of content and the second plurality of customizable trigger events. Moreover, a predictive effectiveness may also be performed by comparing a newly created sequence (but not deployed to client devices) to previously used content portions and triggers to predict an effectiveness of a sequence. For example, if in the above first and second sequence example, content portions A1, B2, and A3, are determined as more effective to use with triggers 1, 2, and 3, then a third sequence that includes content portions A1, B2, and A3 may have its effectiveness predicted based on known effectiveness of the first and second sequences (and corresponding components, such as content portions and triggers).

Consider the following more detailed example of the method of FIG. 3. A browser application of a client device may visit a bank website for the first time. A user make then click the mortgage tab of the website. Data indicative of the visit/browser activity (e.g., visit to the bank website, clicking of the mortgage tab, which browser used, time of day, user information, etc.) may be received by the customizable content server. Because it was the first visit to the bank website, a new profile may be stored by the customizable content server. The new profile may include the data indicative of the browser activity. After the mortgage tab is clicked, the browser may be taken to the mortgage webpage of the bank website. The mortgage website may include the customizable content code, which may include JavaScript to request customized content from the customizable content server. The customizable content server may compare the data indicative of the browser activity to the sequence configuration information (or multiple sets of sequence configuration information) to determine if any trigger event has occurred. Here, a trigger may be clicking the mortgage calculator in the browser. If the mortgage calculator is clicked, a content portion, from a sequence of customizable content, which corresponds to the mortgage calculator trigger may be returned for display in the browser. Such content may include one or more mortgage offers. Continuing the example, the user closes the browser and returns to the mortgage tab two other times in the next two weeks. Suppose another trigger is the third time the mortgage tab is selected. Upon determination, by the customizable content server, that the third mortgage tab selection trigger has occurred, the next content portion (e.g., a timed mortgage offer to try to get the user to complete a loan application) in the sequence may be returned to the browser (for display in the portion of the webpage as defined by the customizable content code). Note that multiple different triggers may correspond to the same content portion. For instance, clicking on the mortgage calculator or clicking on the refinance tab may each be triggers that cause the same next portion of content to be provided to the client device. Moreover, multiple different customizable portions of a webpage may exist at the same time. Those multiple different customizable portions of the webpage may have the same or different triggers. Note that in the mortgage example above, different client devices and/or users may be presented with different sequences.

Although much of the above description and many of the examples describe the method in terms of determining which content portion to provide to a given client device, similar techniques apply in terms of determining which content portion to provide to a given user. For example, the techniques described herein may be independent of the client device used, and instead, determination of which content portion of the sequence to provide to the user or which sequence to provide to the user may be user dependent. For example, determination for user A on client device 1 may be different than the determination for user B on client device 1. Or, the techniques described herein may be dependent on user/client devices combinations such that user A using client device 1 would be a unique visitor and require a separate determination over user A using client device 2.

Turning now to FIG. 4, one embodiment of creating a sequence of content and associated triggers is illustrated. While the blocks are shown in a particular order for ease of understanding, other orders may be used. In some embodiments, the method of FIG. 4 may include additional (or fewer) blocks than shown. Blocks 400-420 may be performed automatically or may receive user input. The method of FIG. 4 may be used in conjunction with the method of FIG. 3. Accordingly, a combination of some or all of the blocks of FIGS. 3 and 4 may be used in some embodiments.

As illustrated at 400, selection of customizable trigger events may be received. For example, in one embodiment, selection of a first plurality of customizable trigger events may be received. As described herein, customizable trigger events may include selection of a particular selectable element, a certain number of visits to a website, etc.

At 410, selection of content portions for a sequence of content may be received. For example, selection of a first plurality of content portions for a first sequence of content may be received. Each of the first plurality of customizable trigger events may be associated with a respective one of the first plurality of content portions. In one embodiment, selection of one of the customizable trigger events may be alternated with selection of one of the content portions. For example, selection of a first trigger event may be followed by selection of a first content portion followed by selection of a second trigger event and a second content portion. FIG. 5 illustrates an example user interface that is usable to perform the selection of the customizable trigger events and content portions.

As shown at 420, sequence configuration information may be generated based on the selected plurality of customizable trigger events and selected plurality of content portions. For example, first sequence configuration information may be generated based on the selected first plurality of customizable trigger events and the selected first plurality of content portions. The first sequence configuration information may be usable to provide the first sequence of content for display based on state information regarding previous content interactions by a user of the client device, as described herein (e.g., at FIG. 3). For instance, the first sequence configuration information may be usable to determine which of the first plurality of content portions to provide for display based on an occurrence of an associated one of the first plurality of trigger events.

In one embodiment, multiple sets of sequence configuration information may be generated, for example, to evaluate the effectiveness of each set of sequence configuration information. In such an embodiment, selection of a second plurality of customizable trigger events and selection of a second plurality of content portions for a second sequence of content may be received. Similar to that of the first sequence, each of the second plurality of customizable trigger events may be associated with a respective one of the second plurality of content portions. The second sequence configuration information may be based on the selected second plurality of customizable trigger events and the selected second plurality of content portions. The second sequence configuration information may be usable to provide the second sequence of content for display, as described herein.

In one embodiment, one of the multiple sets of sequence configuration information (e.g., first or second) may be provided for display based on information associated with a request for content from a client device. For example, which set of sequence configuration information may be determined based on data regarding the client device, a user of the client device, and or a user/client device combination. Such data may be the data indicative of content interactions, as described herein. As a simple example, the first sequence may be provided to client devices that are in the Pacific or Mountain time zones and the second sequence may be provided to client devices that are in the Central or Eastern time zones.

In various embodiments, one or more metrics that are usable to evaluate an effectiveness of the customizable trigger events and/or the content portions may be received. Example metrics may include percent of conversions (e.g., the user clicking on what the website owner would like the user to click on), number of conversions, improvement over a rival sequence (e.g., improvement of first sequence over second sequence), etc.

In one embodiment, the selection of trigger events received at block 400 may be performed according to a predictive model. For example, while a visitor is browsing the website having the customizable content code, the triggers may be automatically determined by the customizable content server running a predictive model to determine when to switch the visitor from one content portion to the next content portion. For instance, if the predictive model determines that the current visitor is similar in behavior (or demographics or otherwise) to one or more previous visitors, then one or more triggers that were effective for the previous visitor(s) may be used as the triggers for the current visitor. Triggers determined in such a manner may then be included as part of the sequence configuration information, which may be used in the method of FIG. 3 to deliver the customized sequence of content, as described herein. In one embodiment, the triggers may be determined and selected according to a standard schedule (e.g., upon loading the first webpage having the configurable content code, periodically (such as every 5 minutes), etc.). As one example of automatic selection of trigger events, a marketer may select content portions for the sequence of content but not the trigger events. Then, after the visitor initiates content with the customizable content server (e.g., via a browser application executing the webpage on a client device of the visitor), one or more corresponding trigger events may be automatically selected by the customizable content server according to a predictive model. Then, at block 420, the configuration information may be generated and usable to deliver the customized sequence of content to the visitor.

Figure 5A:
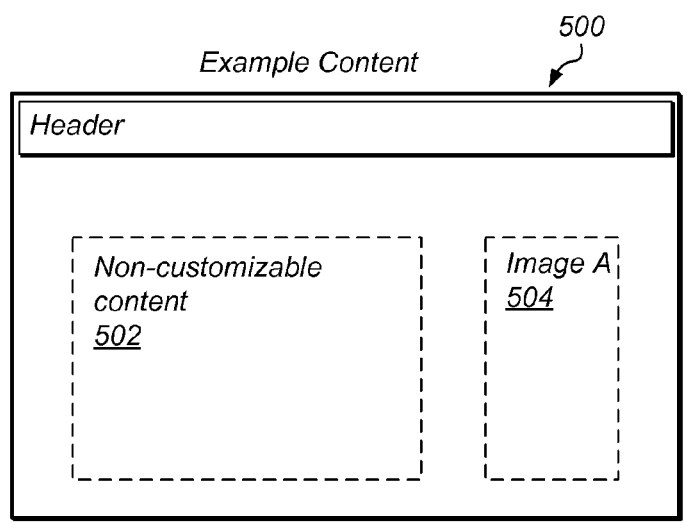
FIGS. 5A-5C illustrate a simple example of a sequence of content.
Figure 5B:
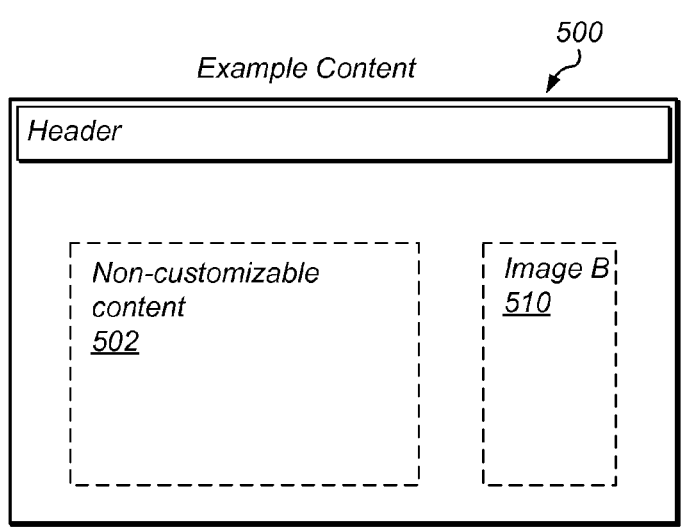
Figure 5C:
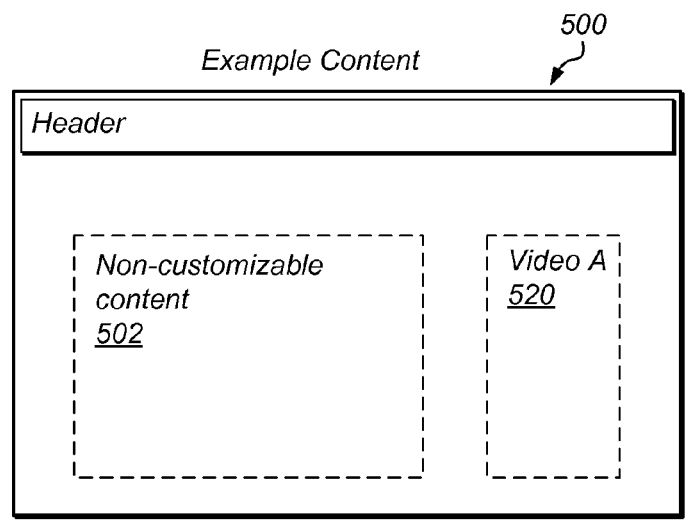

FIGS. 5A-5C illustrate a simple example of a sequence of content. As shown in FIG. 5A, example content 500 may be a browser display of a webpage. Non-customizable content 502 may be a portion of the webpage that does not necessarily change in a sequence according to the disclosed techniques. Image A 504 may be customizable content that is displayed upon a determination that the trigger event corresponding to image A has occurred. The area in which image A is displayed may be implemented in the website (e.g. in the HTML code) as the customizable content code, as described herein. FIG. 5B illustrates the second content portion in the sequence of content as image B 510. In this example, non-customizable content 502 is the same as in FIG. 5A, but in other examples, it may be different non-customizable content. Additionally, although the customizable content portion (image B) in FIG. 5B is located in the same location on the webpage as the customizable content portion (image A) in FIG. 5A, in other examples, various customizable content portions in the sequence of content may be displayed in different locations. FIG. 5C illustrates the third content portion in the sequence of content as video A 520.

Figure 6:
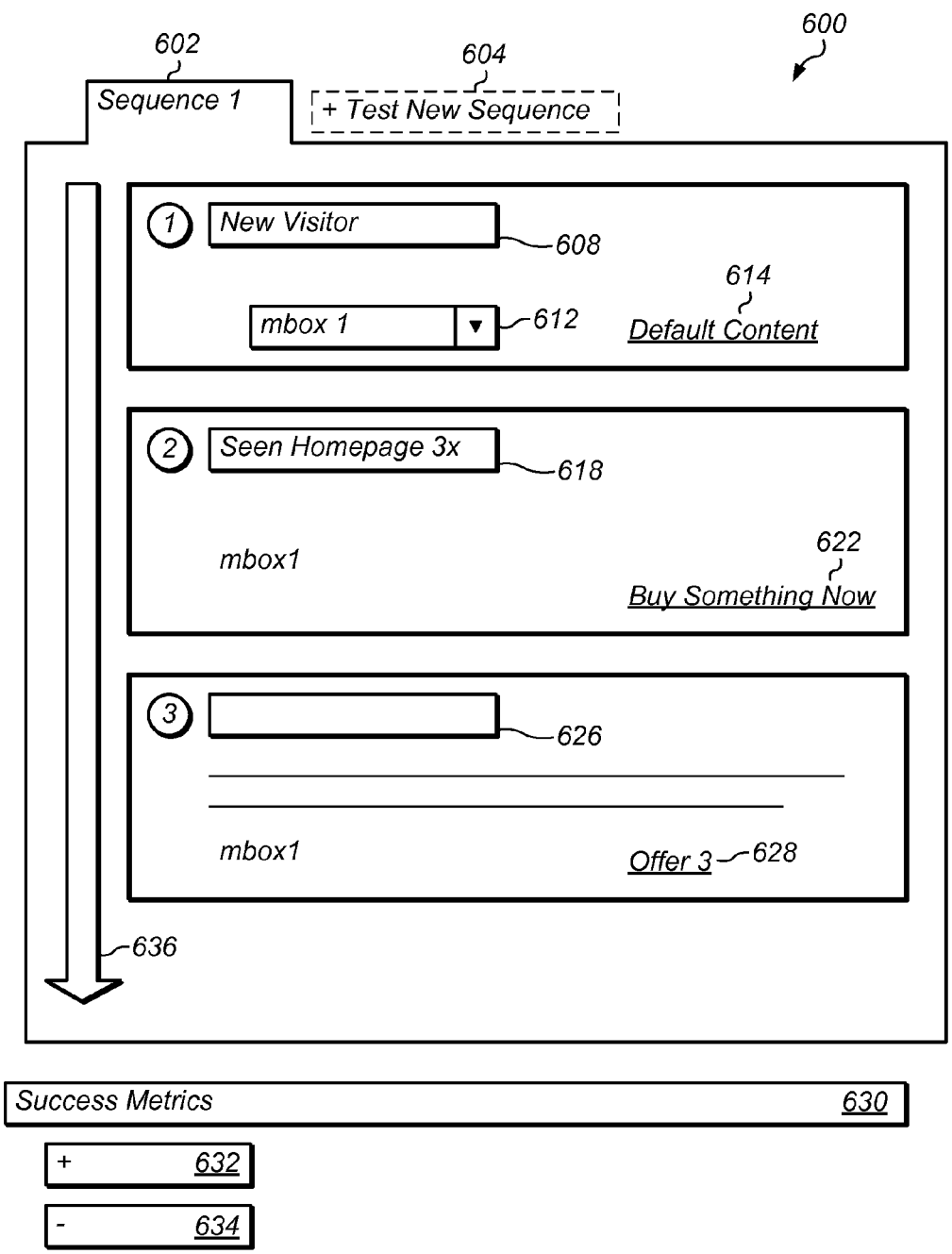
FIG. 6 illustrates an example of an interface useable to define a sequence of content and associated triggers, according to some embodiments.

FIG. 6 illustrates an example interface 600, useable (e.g., by a website owner) to implement the method of FIG. 4 to define a sequence of content and associated triggers, which may aid in understanding the described embodiments. Sequence 602 is the currently highlighted tab in example interface 600 and illustrates various selected trigger events and corresponding content portions for that sequence. Items 608 and 618 display triggers that correspond to the first and second content portions (default content 614 and buy something now 622), respectively. Mbox1 612 corresponds to the customizable content code that is inserted into the website and is executable to cause a request the customizable content from the customizable content server. As shown, mbox 1 612 is a pull down menu that allow selection of other customizable content code (e.g., mbox 2, mbox 3, etc.) such that different customizable content code may be selected to define the sequence. Item 626 is a third trigger event that is associated with the third content portion, offer 3 628. Arrow 636 represents the progression of content in sequence 1. +Test New Sequence 604 permits adding an additional sequence to be created. Success metrics 630 may be defined by either adding or subtracting a metric via + 632 or − 634, respectively. Note that the actual success metric report may reside in a different interface than interface 600.

Exemplary Computer System

Figure 7:
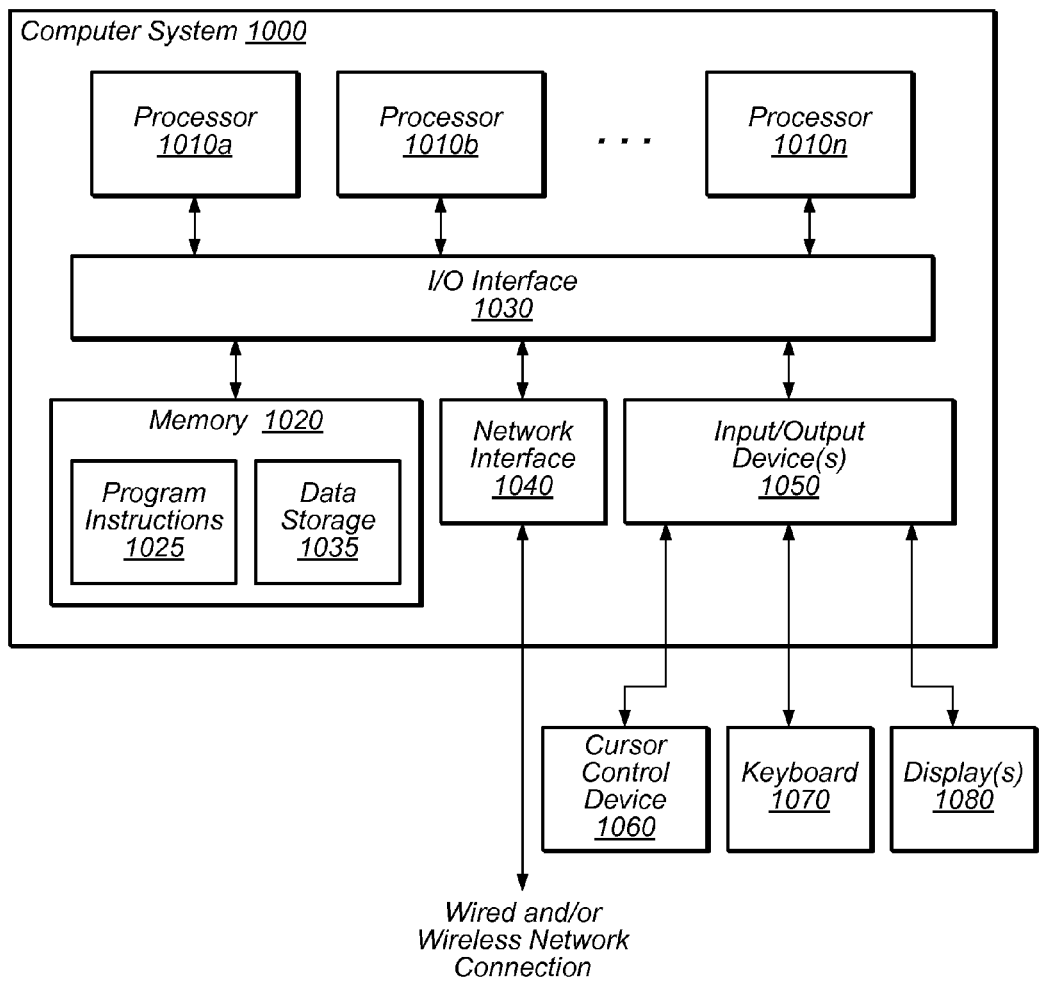
FIG. 7 illustrates an example computer system that may be used in accordance with one or more embodiments.

Various portions of a sequence module and/or a test module and/or customizable content code may be executed on one or more computer systems, which may interact with various other devices. One such computer system is illustrated by FIG. 7. For example, content provider 102, client 104, customizable content server 106, content server 110, browser application 112, test module 118, data store 116, sequence module 118, data collection code 162, and customizable content code 164 may each include, employ or be executed on one or more computer systems.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for customizable sequence of content delivery may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a customizable sequence of content delivery method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of target module and/or a test module and/or customizable content code as described herein, and data storage 1035, comprising various data accessible by program instructions 1025. In one embodiment, program instructions 1025 may include software elements of a customizable sequence of content delivery method illustrated in the above Figures. Data storage 1035 may include data that may be used in embodiments. In other embodiments, other or different software elements and/or data may be included.

Those skilled in the art will appreciate that computer system 1000 is merely illustrative and is not intended to limit the scope of customized sequence of content delivery as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations. In some embodiments, portions of the techniques described herein may be hosted in a cloud computing infrastructure.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A computer implemented method of efficiently providing a webpage with customized content, the method comprising:

providing, by a customizable content server, a webpage with customized content, the customized content selected from a plurality of sequences of content, wherein:
  each content portion in a particular sequence of content corresponds to a respective trigger event and the customized content is selected based on which respective trigger event has occurred,
  each respective trigger event triggers selection of the corresponding content portion based on a respective user interaction accessing particular content of the webpage or user interaction with a particular selectable element of the webpage, and
  occurrences of the trigger events are tracked and stored in a device profile for the client device;
determining, by a predictive model executing on the customizable content server, a similarity between a user of the client device and additional users of additional client devices having additional profiles similar to the device profile, wherein the additional users had previously visited the webpage;
selecting, by the predictive model and based on the determined similarity, a particular respective trigger event, wherein the selected trigger event had been effective for the additional users;
identifying an occurrence of the selected trigger event initiated by the user of the client device accessing the webpage;
storing data indicative of the selected trigger event in the device profile;
determining, by a sequence module of the customizable content server, a particular sequence of content from which to select the customized content based on the selected trigger event;
selecting, by the predictive model, the customized content from the particular sequence of content based on comparing the tracked occurrences of the selected trigger event to prior occurrences of additional trigger events associated with previous user interactions with the webpage by the additional users; and responding to the selected trigger event by providing the webpage with the selected customized content to the client device.

2. The method of claim 1, further comprising evaluating an effectiveness of each sequence of content and the respective trigger events based on user interactions with particular content of the webpage or particular selectable elements of the webpage.

3. The method of claim 1, wherein the respective user interaction accessing particular content of the webpage includes a number of times the client device accessed the particular content of the webpage.

4. The method of claim 1, further comprising providing, to a different client device, the webpage with different customized content based on which respective trigger event has occurred on the different client device.

5. The method of claim 1, wherein selecting the customized content is further based on one or more user characteristics including a geographical region, age, browser, or gender of a user associated with the client device, the geographical region of the user and the browser of the user corresponding to a browser in use at the client device and a geographic region where the client device is located when the occurrence of the selected trigger event is identified.

6. The method of claim 1, wherein the plurality of trigger events are stored in a data store accessible by the customizable content server, the data store including the device profile wherein:

the device profile includes indications of previously provided content portions and a profile counter of the tracked occurrences of the identified trigger event, and selecting the customized content is further based on comparing the indications of previously provided content portions and the profile counter to the prior occurrences of additional trigger events associated with previous user interactions.

7. A system for efficiently providing a webpage with customized content, the system comprising a customizable content server comprising:

a processor; and a memory communicatively coupled to the processor, wherein the processor is configured to execute instructions included in the memory to perform operations comprising:

providing a webpage with customized content, the customized content selected from a plurality of sequences of content, wherein:

each content portion in a particular sequence of content corresponds to a respective trigger event and the customized content is selected based on which respective trigger event has occurred, each respective trigger event triggers selection of the corresponding content portion based on a respective user interaction accessing particular content of the webpage or user interaction with a particular selectable element of the webpage, and occurrences of the trigger events are tracked and stored in a device profile for the client device;

determining, by a predictive model executing on the customizable content server, a similarity between a user of the client device and additional users of additional client devices having additional profiles similar to the device profile, wherein the additional users had previously visited the webpage;

selecting, by the predictive model and based on the determined similarity, a particular respective trigger event, wherein the selected trigger event had been effective for the additional users;

identifying an occurrence of the selected trigger event initiated by the user of the client device accessing the webpage;

storing data indicative of the selected trigger event in the device profile;

determining, by a sequence module, a particular sequence of content from which to select the customized content based on the selected trigger event;

selecting, by the predictive model, the customized content from the particular sequence of content based on comparing the tracked occurrences of the selected trigger event to prior occurrences of additional trigger events associated with previous user interactions with the webpage by the additional users; and responding to the selected trigger event by providing the webpage with the selected customized content to the client device.

8. The system of claim 7, wherein the processor is further configured to execute instructions to perform operations comprising evaluating an effectiveness of each sequence of content and the respective trigger events based on user interactions with particular content of the webpage or particular selectable elements of the webpage.

9. The system of claim 7, wherein the respective user interaction accessing particular content of the webpage includes a number of times the client device accessed the particular content of the webpage.

10. The system of claim 7, wherein the processor is further configured to execute instructions to perform operations comprising providing, to a different client device, the webpage with different customized content based on which respective trigger event has occurred on the different client device.

11. The system of claim 7, wherein selecting the customized content is further based on one or more user characteristics including a geographical region, age, browser, or gender of a user associated with the client device, the geographical region of the user and the browser of the user corresponding to a browser in use at the client device and a geographic region where the client device is located when the occurrence of the selected trigger event is identified.

12. The system of claim 7, wherein the plurality of trigger events are stored in a data store, the data store accessible by the customizable content server, the data store including the device profile wherein:

the device profile includes indications of previously provided content portions and a profile counter of the tracked occurrences of the identified trigger event, and selecting the customized content is further based on comparing the indications of previously provided content portions and the profile counter to the prior occurrences of additional trigger events associated with previous user interactions.

13. A non-transitory computer-readable medium storing program code, that when executed by a customizable content server, cause the customizable content server to perform operations for efficiently providing a webpage with customized content, the operations comprising:

providing a webpage with customized content, the customized content from a plurality of sequences of content, wherein:
  each content portion in a particular sequence of content corresponds to a respective trigger event and the customized content is selected based on which respective trigger event has occurred,
  each respective trigger event triggers selection of the corresponding content portion based on a respective user interaction accessing particular content of the webpage or user interaction with a particular selectable element of the webpage, and
occurrences of the trigger events are tracked and stored in a device profile for the client device;
determining, by a predictive model executing on the customizable content server, a similarity between a user of the client device and additional users of additional client devices having additional profiles similar to the device profile, wherein the additional users had previously visited the webpage;
selecting, by the predictive model and based on the determined similarity, a particular respective trigger event, wherein the selected trigger event had been effective for the additional users;
identifying an occurrence of the selected trigger event initiated by the user of the client device accessing the webpage;
storing data indicative of the selected trigger event in the device profile;
determining, by a sequence module of the customizable content server, a particular sequence of content from which to select the customized content based on the selected trigger event;
selecting, by the predictive model, the customized content from the particular sequence of content based on comparing the tracked occurrences of the selected trigger event to prior occurrences of additional trigger events associated with previous user interactions with the webpage by the additional users; and
responding to the selected trigger event by providing the webpage with the selected customized content to the client device.

14. The non-transitory computer-readable medium of claim 13, the operations further comprising evaluating an effectiveness of each sequence of content and the respective trigger events based on user interactions with particular content of the webpage or particular selectable elements of the webpage.

15. The non-transitory computer-readable medium of claim 13, wherein the respective user interaction accessing particular content of the webpage includes a number of times the client device accessed the particular content of the webpage.

16. The non-transitory computer-readable medium of claim 13, the operations further comprising providing, to a different client device, the webpage with different customized content based on which respective trigger event has occurred on the different client device.

17. The non-transitory computer-readable medium of claim 13, wherein selecting the customized content is further based on one or more user characteristics including a geographical region, age, browser, or gender of a user associated with the client device, the geographical region of the user and the browser of the user corresponding to a browser in use at the client device and a geographic region where the client device is located when the occurrence of the selected trigger event is identified.

18. The non-transitory computer-readable medium of claim 13, wherein the plurality of trigger events are stored in a data store accessible by the customizable content server, the data store including the device profile wherein:
  the device profile includes indications of previously provided content portions and a profile counter of the tracked occurrences of the identified trigger event, and selecting the customized content is further based on comparing the indications of previously provided content portions and the profile counter to the prior occurrences of additional trigger events associated with previous user interactions.

* * * * *